(12) United States Patent
Kojima et al.

(10) Patent No.: US 12,315,894 B2
(45) Date of Patent: May 27, 2025

(54) POWER STORAGE MODULE

(71) Applicant: PRIME PLANET ENERGY & SOLUTIONS, INC., Tokyo (JP)

(72) Inventors: Yasumasa Kojima, Kasai (JP); Takashi Inamura, Himeji (JP); Takatoshi Kageyama, Kakogawa (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 833 days.

(21) Appl. No.: 17/551,351

(22) Filed: Dec. 15, 2021

(65) Prior Publication Data

US 2022/0200063 A1    Jun. 23, 2022

(30) Foreign Application Priority Data

Dec. 21, 2020  (JP) ................................. 2020-211172

(51) Int. Cl.
| | |
|---|---|
| *H01M 10/42* | (2006.01) |
| *G01K 1/143* | (2021.01) |
| *G01K 7/22* | (2006.01) |
| *H01M 10/6571* | (2014.01) |
| *H01M 50/287* | (2021.01) |
| *H01M 50/414* | (2021.01) |

(52) U.S. Cl.
CPC .......... *H01M 10/425* (2013.01); *G01K 1/143* (2013.01); *G01K 7/22* (2013.01); *H01M 10/6571* (2015.04); *H01M 50/287* (2021.01); *H01M 50/414* (2021.01)

(58) Field of Classification Search
CPC ............. H01M 10/486; H01M 10/425; H01M 50/284; G01K 1/143
See application file for complete search history.

(56) References Cited

U.S. PATENT DOCUMENTS

| | | |
|---|---|---|
| 2015/0214583 A1 | 7/2015 | Lim et al. |
| 2017/0194771 A1 | 7/2017 | Aoki |
| 2020/0203782 A1 | 6/2020 | Yoon |
| 2020/0313140 A1* | 10/2020 | Liu ...................... H01R 11/288 |
| 2020/0333192 A1 | 10/2020 | Takase et al. |

(Continued)

FOREIGN PATENT DOCUMENTS

| | | |
|---|---|---|
| CN | 106415917 A | 2/2017 |
| CN | 110574220 A | 12/2019 |

(Continued)

*Primary Examiner* — Kourtney R S Carlson
(74) *Attorney, Agent, or Firm* — Finnegan, Henderson, Farabow, Garrett, and Dunner, LLP

(57) ABSTRACT

In a stack, a plurality of power storage cells are stacked. A resin plate is placed on the stack. A flexible printed circuit board is placed on the resin plate and has an electric circuit electrically connected to the plurality of power storage cells. A thermistor element is provided on the electric circuit and is in contact with one power storage cell of the plurality of power storage cells to detect a temperature of the power storage cell. A cover member is provided on the resin plate to cover the flexible printed circuit board. An elastic body is located between the cover member and the thermistor element to press the thermistor element toward the power storage cell. The cover member includes a protuberance that protrudes toward the resin plate side. The elastic body is disposed on the protuberance.

8 Claims, 4 Drawing Sheets

(56) References Cited

U.S. PATENT DOCUMENTS

2021/0148766 A1  5/2021  Takase et al.
2022/0123381 A1  4/2022  Hou

FOREIGN PATENT DOCUMENTS

| CN | 111164397 A | 5/2020 |
|---|---|---|
| CN | 210628444 U | 5/2020 |
| JP | 2001-185239 A | 7/2001 |
| JP | 2009-276071 A | 11/2009 |
| JP | 2013-097894 A | 5/2013 |
| JP | 2016-018740 A | 2/2016 |
| JP | 2020-513149 A | 4/2020 |
| WO | WO 2019/073857 A1 | 4/2019 |
| WO | WO 2019/073917 A1 | 4/2019 |
| WO | WO 2020/054305 A1 | 3/2020 |

\* cited by examiner

POWER STORAGE MODULE

This nonprovisional application is based on Japanese Patent Application No. 2020-211172 filed on Dec. 21, 2020, with the Japan Patent Office, the entire contents of which are hereby incorporated by reference.

BACKGROUND OF THE INVENTION

Field of the Invention

The present technology relates to a power storage module.

Description of the Background Art

WO 2019/073857 is a prior art document that discloses a configuration of a power storage module. The power storage module described in WO 2019/073857 includes: a detection object that is a power storage element; and a sensor unit. The sensor unit includes a conductive path member, a sensor element, a mount, and a biasing member. The conductive path member is disposed on the detection object. The sensor element is connected to a conductive path on a surface of the conductive path member. The mount is provided on the conductive path member to cover the sensor element. The biasing member biases the mount toward the detection object to bring the conductive path member into contact with the detection object. A protector composed of a resin is provided between the mount and the sensor element to cover the sensor element.

SUMMARY OF THE INVENTION

In the power storage module described in WO 2019/073857, the configuration of the sensor unit is complicated. When detecting the temperature of the power storage cell by pressing a thermistor element toward the power storage cell by the biasing member, precision in temperature detection may be decreased due to heat conduction through the biasing member and the thermistor element.

The present technology has been made to solve the above-described problem and has an object to provide a power storage module having a simple configuration to suppress decreased precision in temperature detection by a thermistor element.

A power storage module according to the present technology includes a stack, a resin plate, a flexible printed circuit board, a thermistor element, a cover member composed of a resin, and an elastic body. In the stack, a plurality of power storage cells are stacked. The resin plate is placed on the stack. The flexible printed circuit board is placed on the resin plate and has an electric circuit electrically connected to the plurality of power storage cells. The thermistor element is provided on the electric circuit and is in contact with one power storage cell of the plurality of power storage cells to detect a temperature of the power storage cell. The cover member is provided on the resin plate to cover the flexible printed circuit board. The elastic body is located between the cover member and the thermistor element to press the thermistor element toward the power storage cell. The cover member includes a protuberance that protrudes toward the resin plate side. The elastic body is disposed on the protuberance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
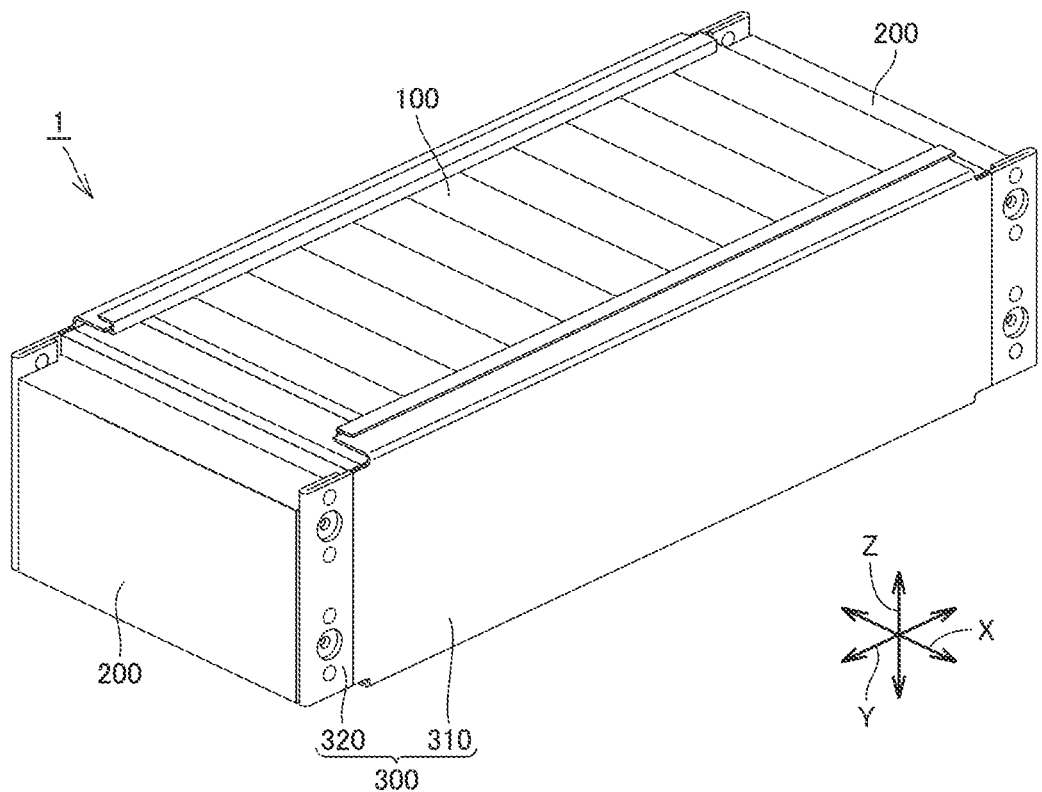
FIG. 1 is a diagram showing a basic configuration of a battery pack.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

In the present specification, the "power storage cell" or the "power storage module" is not limited to a battery cell or a battery module, and may include a capacitor cell or a capacitor module.

Figure 2:
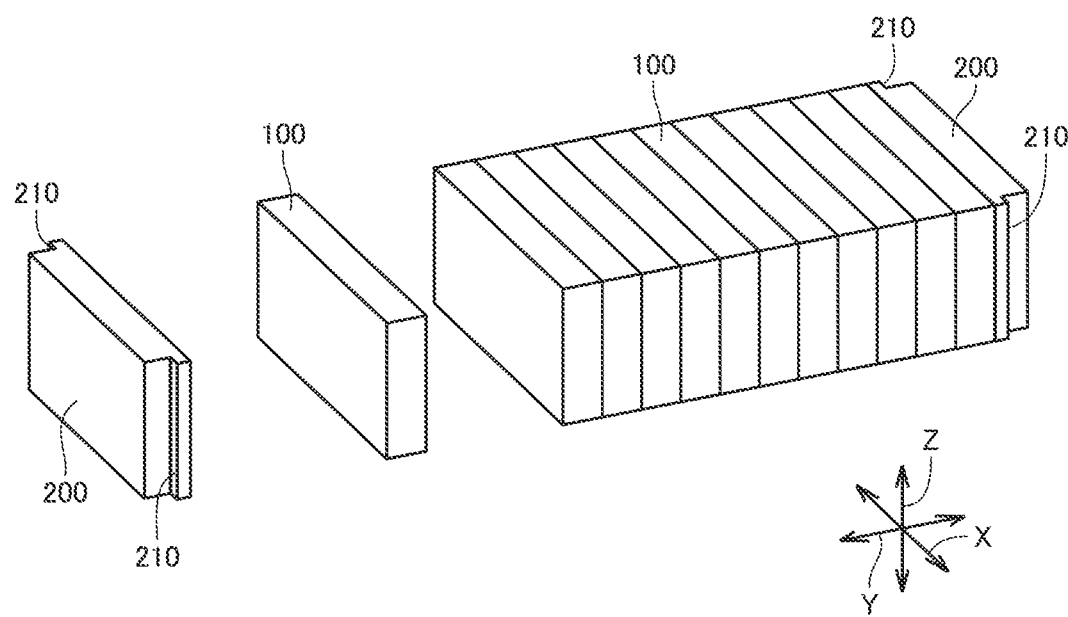
FIG. 2 is a diagram showing battery cells and end plates in the battery pack shown in FIG. 1.

FIG. 1 is a diagram showing a basic configuration of a battery pack 1. FIG. 2 is a diagram showing battery cells 100 and end plates 200 included in battery pack 1.

As shown in FIGS. 1 and 2, battery pack 1, which serves as an exemplary "power storage module", includes battery cells 100, end plates 200, and a restraint member 300.

The plurality of battery cells 100 are provided side by side in a Y axis direction (arrangement direction). Thus, a stack of battery cells 100 is formed. A separator (not shown) is interposed between the plurality of battery cells 100. The plurality of battery cells 100, which are interposed between two end plates 200, are pressed by end plates 200, and are therefore restrained between two end plates 200.

End plates 200 are disposed beside both ends of battery pack 1 in the Y axis direction. Each of end plates 200 is fixed to a base such as a case that accommodates battery pack 1. Stepped portions 210 are formed at both ends of end plate 200 in an X axis direction.

Restraint member 300 connects two end plates 200 to each other. Restraint member 300 is attached to stepped portions 210 formed on two end plates 200.

Restraint member 300 is engaged with end plates 200 with compression force in the Y axis direction being exerted to the stack of the plurality of battery cells 100 and end plates 200, and then the compression force is released, with the result that tensile force acts on restraint member 300 that connects two end plates 200 to each other. As a reaction thereto, restraint member 300 presses two end plates 200 in directions of bringing them closer to each other.

Restraint member 300 includes a first member 310 and a second member 320. First member 310 and second member 320 are coupled to each other by butt welding, for example. Tip surfaces formed by folding second member 320 are brought into abutment with stepped portions 210 of end plate 200 in the Y axis direction.

Figure 3:
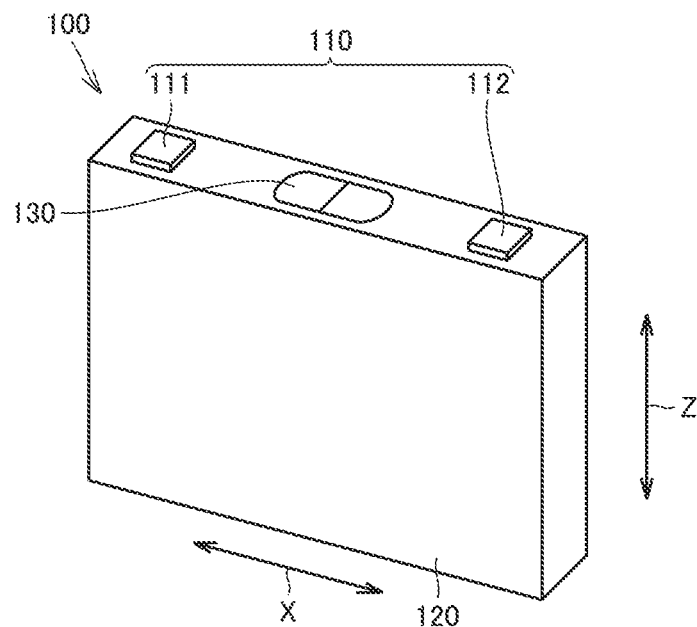
FIG. 3 is a diagram showing a battery cell in the battery pack shown in FIG. 1.

FIG. 3 is a diagram showing battery cell 100 in battery pack 1. As shown in FIG. 3, battery cell 100 includes electrode terminal 110, a housing 120, and a gas discharge valve 130.

Electrode terminal 110 includes a positive electrode terminal 111 and a negative electrode terminal 112. Electrode terminal 110 is formed on housing 120. Housing 120 is formed to have a substantially rectangular parallelepiped shape. An electrode assembly (not shown) and an electrolyte solution (not shown) are accommodated in housing 120. Gas discharge valve 130 is fractured when pressure inside housing 120 becomes equal to or more than a predetermined value. Thus, gas in housing 120 is discharged to the outside of housing 120.

Figure 4:
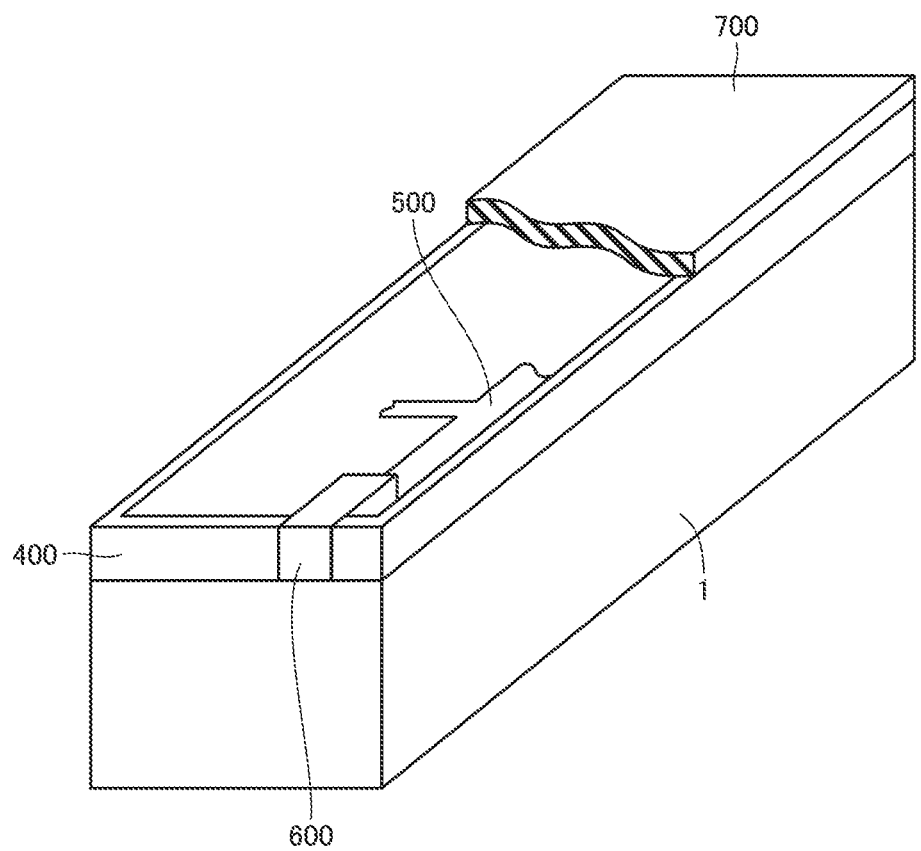
FIG. 4 is a perspective view showing a state in which a wiring module is provided on the battery pack.

FIG. 4 is a perspective view showing a state in which a wiring module is provided on battery pack 1. As shown in FIG. 4, a plate member 400 is placed on battery pack 1, and a wiring member 500 is provided on plate member 400. Wiring member 500 can be electrically connected to an external device via a connector 600. A cover member 700 is provided on plate member 400 so as to cover wiring member 500.

Figure 5:
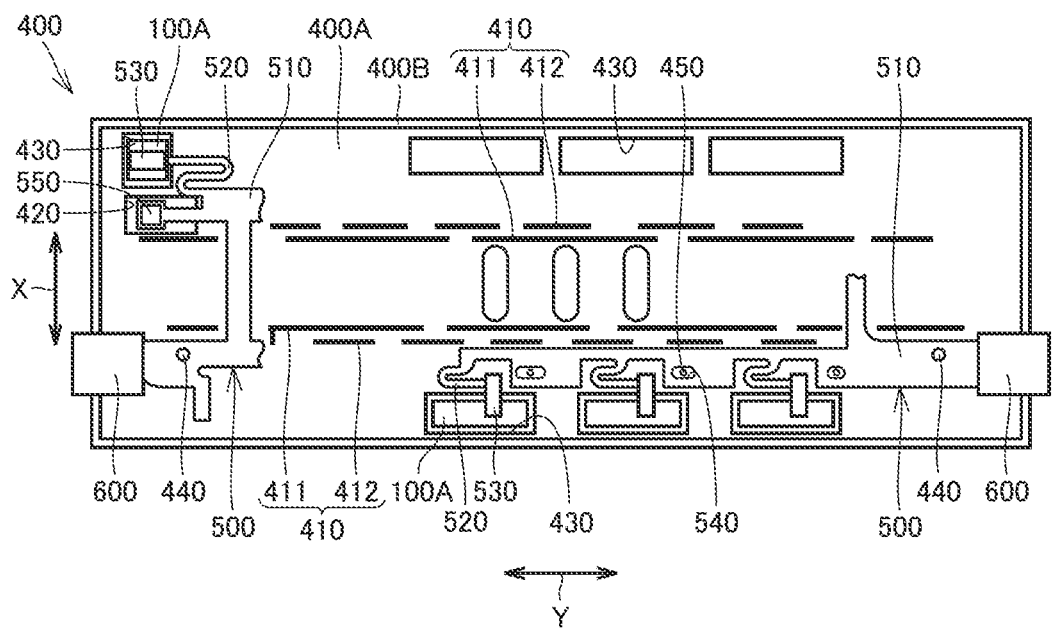
FIG. 5 is a schematic top view of the wiring module placed on the battery pack.

FIG. 5 is a schematic top view of the wiring module placed on battery pack 1. As shown in FIG. 5, the wiring module includes plate member 400, wiring member 500, and connector 600.

Plate member 400 (bus bar plate) is a resin plate having insulation property and heat resistance. Plate member 400 has: a bottom surface portion 400A; and a side surface portion 400B formed to extend upward from bottom surface portion 400A in a Z axis direction.

Plate member 400 is provided with wall portions 410, openings 420, 430, and protrusions 440, 450.

Each of wall portions 410 is formed to extend upward from bottom surface portion 400A of plate member 400 in the Z axis direction. Wall portion 410 includes: a first wall portion 411 formed on the center side in the X axis direction; and a second wall portion 412 provided on the outer side in the X axis direction in parallel with first wall portion 411. Each of first wall portion 411 and second wall portion 412 is formed to extend discontinuously in the Y axis direction.

Each of first wall portion 411 and second wall portion 412 can serve as a protection wall that prevents sparking generated in plate member 400 from being directly exposed to outside while securing a path for discharging, to the outside of the battery pack, the gas discharged from housing 120 of battery cell 100.

Opening 420 is located above a position between electrode terminal 110 and gas discharge valve 130 in battery cell 100 located at the end in the Y axis direction among the plurality of stacked battery cells 100. Each of openings 430 is located above electrode terminal 110 of battery cell 100.

Each of protrusions 440 (projections) extends through wiring member 500 in the vicinity of connector 600. Thus, connector 600 is positioned.

The plurality of protrusions 450 are formed side by side in the Y axis direction. Each of the plurality of protrusions 450 extends through wiring member 500. The number of protrusions 450 can be appropriately changed.

Wiring member 500 includes a flexible printed circuit board 510, displacement absorbing portions 520, bus bar joining portions 530, elongated holes 540, and a thermistor element 550.

Flexible printed circuit board 510 is a board in which an electric circuit is formed on a base member including a base film having an insulation property and a conductive metal foil. The base film is composed of, for example, polyimide or the like. The conductive metal foil is composed of, for example, a copper foil or the like. Flexible printed circuit board 510 has flexibility and has such a characteristic that the electric characteristics of flexible printed circuit board 510 are maintained even when deformed.

Each of displacement absorbing portions 520 is formed by forming a portion of flexible printed circuit board 510 into a substantially U-shape so as to facilitate deformation. Displacement absorbing portion 520 is connected to bus bar joining portion 530. Bus bar joining portion 530 is joined to bus bar 100A that couples electrode terminals 110 of the plurality of battery cells 100. Thus, the electric circuit provided on flexible printed circuit board 510 and battery pack 1 are electrically connected to each other. With displacement absorbing portion 520, displacements (in the X axis direction, the Y axis direction, and the Z axis direction) of bus bar joining portion 530 can be absorbed.

The plurality of elongated holes 540 are formed side by side in the Y axis direction. The number of elongated holes 540 can be appropriately changed. Each of the plurality of protrusions 450 is inserted into a corresponding one of the plurality of elongated holes 540. The lengths of elongated holes 540 in the Y axis direction are longer in the direction further away from connector 600. In this way, positioning can be readily performed when placing wiring member 500 and connector 600 on plate member 400.

Thermistor element 550 is provided on the electric circuit of flexible printed circuit board 510. Thermistor element 550 is disposed on one battery cell 100 located at the end in the Y axis direction among the plurality of battery cells 100 in battery pack 1. Thermistor element 550 is in contact with the above-described one battery cell 100 via opening 420 to detect the temperature of this battery cell 100. Thus, thermistor element 550 detects the temperature of battery cell 100 having the lowest temperature in battery pack 1. It should be noted that thermistor element 550 may detect the temperature of battery cell 100 having the highest temperature in battery pack 1, or a plurality of thermistor elements 550 may be used to detect the temperatures of a plurality of battery cells 100.

Connector 600 is fixed to flexible printed circuit board 510. The electric circuit in flexible printed circuit board 510 and an external electric device can be electrically connected to each other via connector 600.

Figure 6:
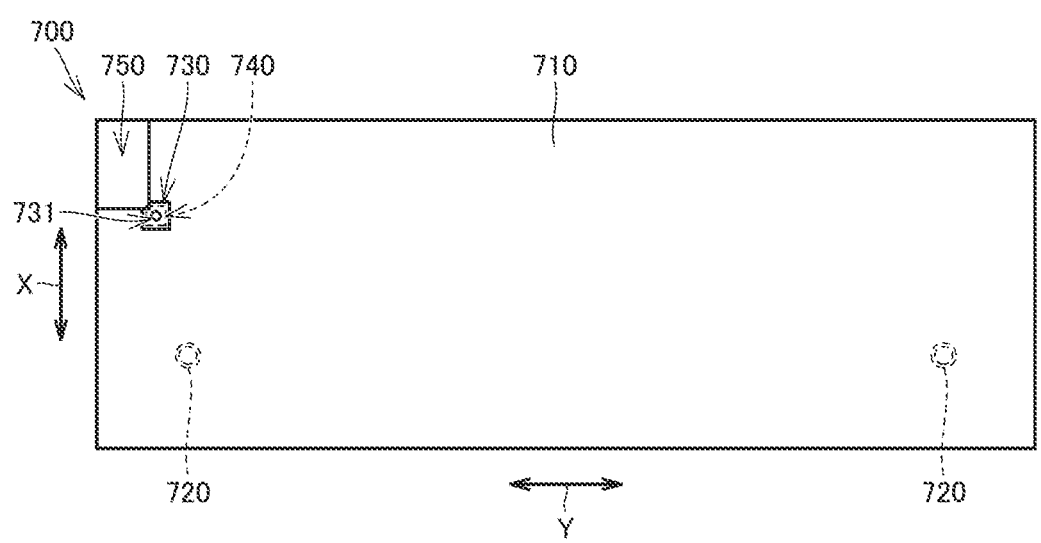
FIG. 6 is a schematic top view of a cover member that covers the wiring module.

FIG. 6 is a schematic top view of cover member 700 (bus bar cover) that covers the wiring module shown in FIG. 5. Cover member 700 is provided on plate member 400 to cover flexible printed circuit board 510.

As shown in FIG. 6, cover member 700 includes a main body 710, tubular protrusions 720, a protuberance 730, and an opening/closing window 750. Each of tubular protrusions 720 protrudes toward flexible printed circuit board 510 on plate member 400.

Protuberance 730 protrudes from main body 710 toward the plate member 400 side. Protuberance 730 has a tubular shape having a bottom to bulge from main body 710. Protuberance 730 is formed at a position beside thermistor element 550 in the Z axis direction.

An elastic body 740 is disposed on protuberance 730. Elastic body 740 is adhered to protuberance 730. Elastic body 740 is, for example, a resin foam such as a sponge. It should be noted that elastic body 740 may be elastically deformable at least in the Z axis direction, and may be another resin elastic body such as a rubber or a resin spring, or may be a metal elastic body.

Protuberance 730 is provided with a through hole 731 that extends, in the Z axis direction, to a position to reach elastic body 740 from the side opposite to the side on which elastic body 740 is disposed. Thus, elastic body 740 is visually recognizable from the outside of cover member 700 via through hole 731.

The colors of the surfaces of elastic body 740 and cover member 700 are different from each other. The color of the surface of elastic body 740 is, for example, a black color. The color of the surface of cover member 700 is, for example, a milky-white color. Thus, it can be confirmed whether or not elastic body 740 is disposed on protuberance 730 in accordance with whether or not the black color portion of elastic body 740 in conformity with the shape of through hole 731 can be confirmed in the milky-white color background when visually checking from the outside of cover member 700 via through hole 731.

Opening/closing window 750 is provided adjacent to protuberance 730. Opening/closing window 750 is provided to open and close an opening formed at a corner portion of main body 710 by using a hinge (not shown) or the like. By opening opening/closing window 750, the surroundings of elastic body 740 can be visually recognized from the outside of cover member 700.

Figure 7:
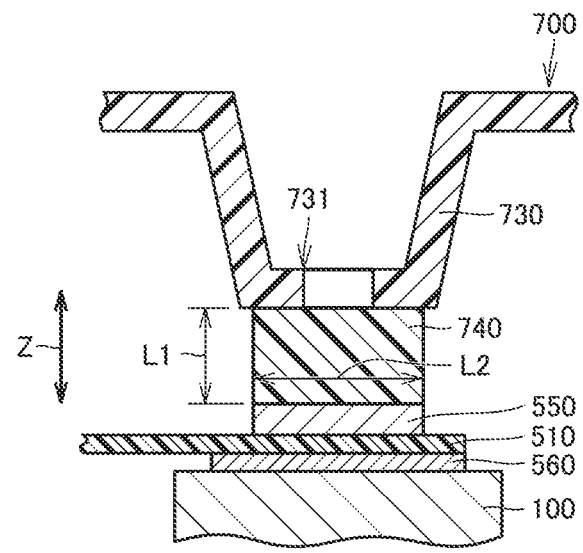
FIG. 7 is a cross sectional view showing a state immediately before pressing a thermistor element toward the battery cell by an elastic body located between the cover member and the thermistor element.

FIG. 7 is a cross sectional view showing a state immediately before pressing the thermistor element toward the battery cell by the elastic body located between the cover member and the thermistor element. As shown in FIG. 7, a plate-like member 560 is provided on the side of flexible printed circuit board 510 opposite to the thermistor element side. Plate-like member 560 is provided to improve heat conductivity between thermistor element 550 and battery cell 100 and to facilitate mounting of thermistor element 550 on flexible printed circuit board 510. Plate-like member 560 is composed of, for example, aluminum.

Elastic body 740 is located between cover member 700 and thermistor element 550 in the Z axis direction to press thermistor element 550 toward battery cell 100. Specifically, elastic body 740 presses thermistor element 550, flexible printed circuit board 510, and plate-like member 560 toward battery cell 100 by a repulsive force when elastic body 740 is sandwiched between protuberance 730 and thermistor element 550 and is elastically deformed. Thus, thermistor element 550 is brought into close contact with battery cell 100 with flexible printed circuit board 510 and plate-like member 560 being interposed therebetween.

In the state before elastic body 740 is sandwiched between cover member 700 and thermistor element 550, a ratio of size L2 of the minimum width of elastic body 740 in a direction perpendicular to a direction (Z axis direction) in which elastic body 740 is sandwiched between cover member 700 and thermistor element 550, with respect to size L1 of the height of elastic body 740 in the Z axis direction is more than or equal to 1. Thus, when elastic body 740 is sandwiched between protuberance 730 and thermistor element 550, elastic body 740 is less likely to be buckled.

Figure 8:
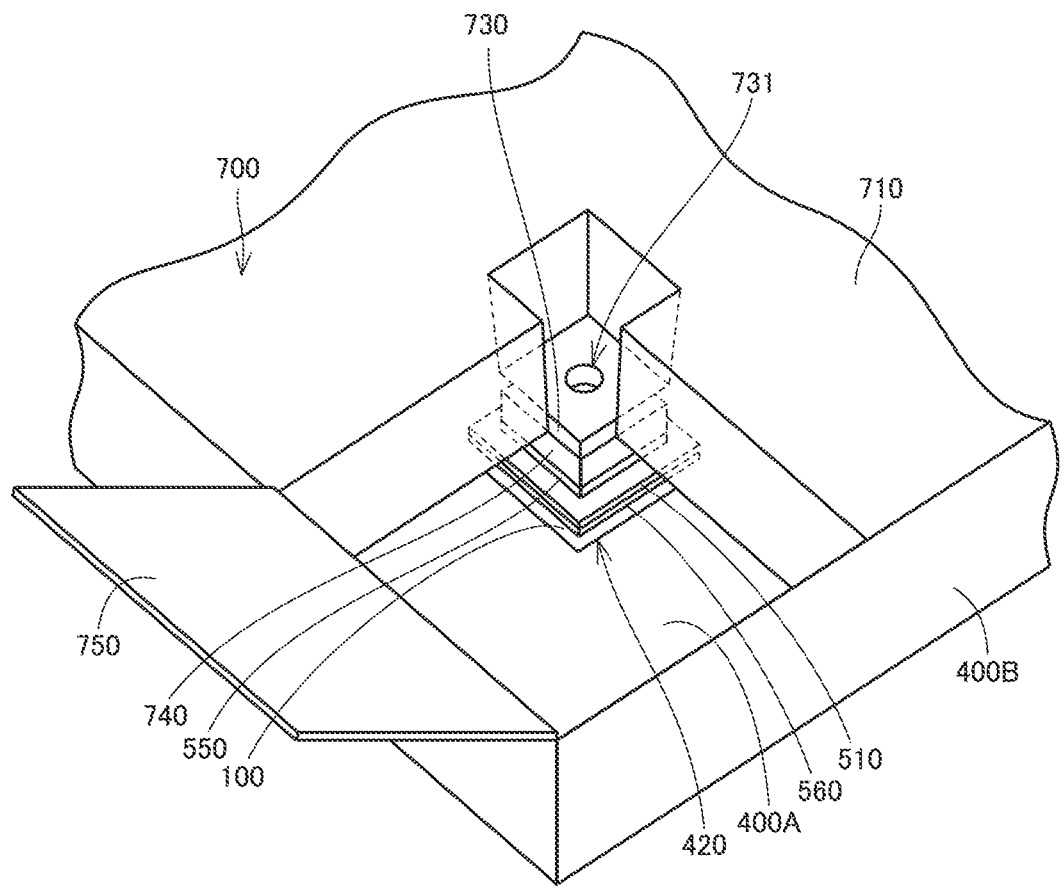
FIG. 8 is a perspective view showing a state in which an opening/closing window provided in the cover member is opened.

FIG. 8 is a perspective view showing a state in which the opening/closing window provided in the cover member is opened. As shown in FIG. 8, a contact state between elastic body 740 and thermistor element 550 is visually recognizable with opening/closing window 750 being opened. Thus, it can be confirmed whether or not elastic body 740 presses thermistor element 550 toward battery cell 100.

In the power storage module according to the present embodiment, with such a simple configuration that thermistor element 550 is pressed toward battery cell 100 by elastic body 740 that is composed of a resin and that is disposed on protuberance 730 provided in cover member 700 composed of a resin, thermistor element 550 can be brought into close contact with battery cell 100 with flexible printed circuit board 510 being interposed therebetween in such a state that elastic body 740 composed of a resin and having a low heat conductivity is interposed between thermistor element 550 and cover member 700 while securing a long heat conduction distance between thermistor element 550 and main body 710 of cover member 700, with the result that precision in temperature detection by thermistor element 550 can be suppressed from being decreased due to heat conduction through elastic body 740 and thermistor element 550.

In the power storage module according to the present embodiment, in the state before elastic body 740 is sandwiched between cover member 700 and thermistor element 550, the ratio of size L2 of the minimum width of elastic body 740 in the direction perpendicular to the direction in which elastic body 740 is sandwiched between cover member 700 and thermistor element 550, with respect to size L1 of the height of elastic body 740 in the direction in which elastic body 740 is sandwiched between cover member 700 and thermistor element 550 is more than or equal to 1, so that elastic body 740 is less likely to be buckled and elastic body 740 is less likely to be inclined in the X axis direction and the Y axis direction when elastic body 740 is compressed in the Z axis direction, thereby stably pressing thermistor element 550 toward battery cell 100 by elastic body 740.

In the power storage module according to the present embodiment, since cover member 700 is provided with opening/closing window 750 and the contact state between elastic body 740 and thermistor element 550 is visually recognizable from the outside of cover member 700 with opening/closing window 750 being opened, it can be confirmed whether or not elastic body 740 presses thermistor element 550 toward battery cell 100 after cover member 700 is assembled to plate member 400.

In the power storage module according to the present embodiment, since protuberance 730 is provided with through hole 731 that extends to the position to reach elastic body 740 from the side opposite to the side on which elastic body 740 is disposed, it can be confirmed whether or not elastic body 740 is disposed on protuberance 730 by visually checking through hole 731 from the outside of cover member 700.

In the power storage module according to the present embodiment, since the colors of the surfaces of elastic body 740 and cover member 700 are different from each other, it can be readily confirmed whether or not elastic body 740 is disposed on protuberance 730 by visually checking through hole 731 from the outside of cover member 700.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A power storage module comprising:
   a stack in which a plurality of power storage cells are stacked;
   a resin plate placed on the stack;
   a flexible printed circuit board placed on the resin plate and having an electric circuit electrically connected to the plurality of power storage cells;
   a thermistor element provided on the electric circuit and in contact with one power storage cell of the plurality of power storage cells to detect a temperature of the power storage cell;
   a cover member provided on the resin plate to cover the flexible printed circuit board, the cover member being composed of a resin; and
   an elastic body located between the cover member and the thermistor element to press the thermistor element toward the power storage cell, wherein the cover member includes a protuberance that protrudes toward the resin plate side,
   the elastic body is disposed on the protuberance, and
   the protuberance is provided with a through hole that extends to a position to reach the elastic body from a side opposite to a side on which the elastic body is disposed.

2. The power storage module according to claim 1, wherein in a state before the elastic body is sandwiched between the cover member and the thermistor element, a ratio of a size of a minimum width of the elastic body in a direction perpendicular to a direction in which the elastic body is sandwiched between the cover member and the thermistor element, with respect to a size of a height of the elastic body in the direction in which the elastic body is sandwiched between the cover member and the thermistor element is more than or equal to 1.

3. The power storage module according to claim 2, wherein colors of surfaces of the elastic body and the cover member are different from each other.

4. The power storage module according to claim 1, wherein
   the cover member is provided with an opening/closing window, and
   a contact state between the elastic body and the thermistor element is visually recognizable with the opening/closing window being opened.

5. The power storage module according to claim 4, wherein colors of surfaces of the elastic body and the cover member are different from each other.

6. The power storage module according to claim 2, wherein
   the cover member is provided with an opening/closing window, and
   a contact state between the elastic body and the thermistor element is visually recognizable with the opening/closing window being opened.

7. The power storage module according to claim 6, wherein colors of surfaces of the elastic body and the cover member are different from each other.

8. The power storage module according to claim 1, wherein colors of surfaces of the elastic body and the cover member are different from each other.

* * * * *